March 2, 1948.  P. F. DANEL  2,436,793
SEA WAVE POWER INSTALLATION
Filed Oct. 5, 1945  4 Sheets-Sheet 1

INVENTOR
PIERRE F. DANEL
BY
ATTORNEY

March 2, 1948.  P. F. DANEL  2,436,793
SEA WAVE POWER INSTALLATION
Filed Oct. 5, 1945  4 Sheets-Sheet 2
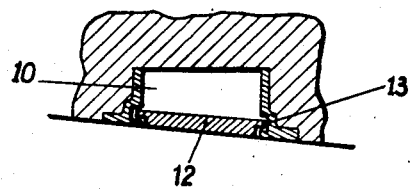
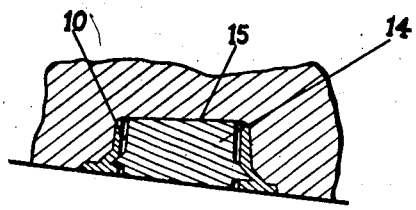
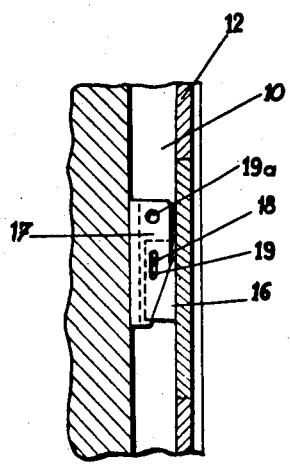
INVENTOR
PIERRE F. DANEL
BY
George N Corey
ATTORNEY March 2, 1948.　　　　　P. F. DANEL　　　　　2,436,793
SEA WAVE POWER INSTALLATION
Filed Oct. 5, 1945　　　　　4 Sheets-Sheet 4
*Fig. 10*
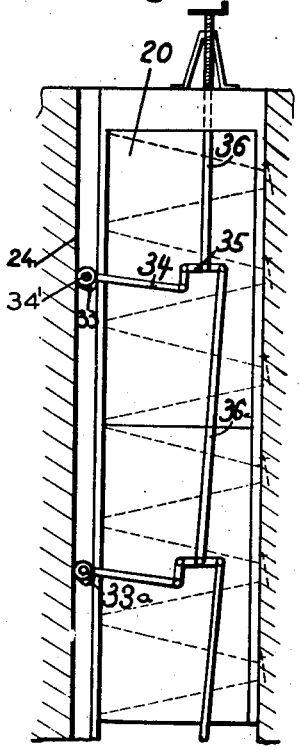
*Fig. 11*
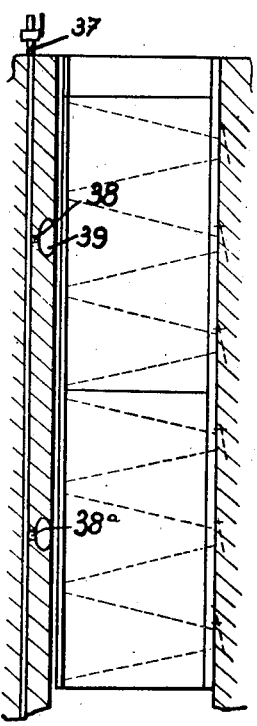
*Fig. 12*
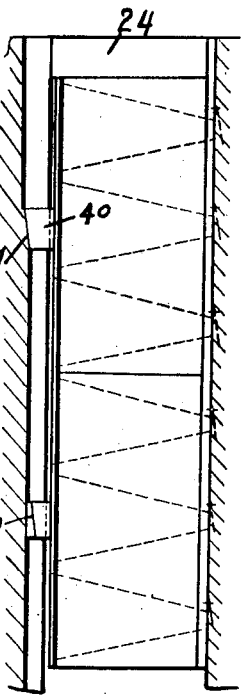
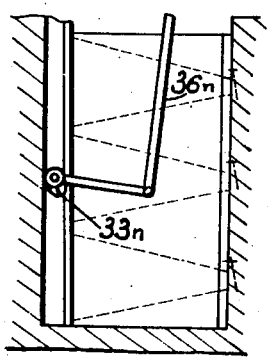
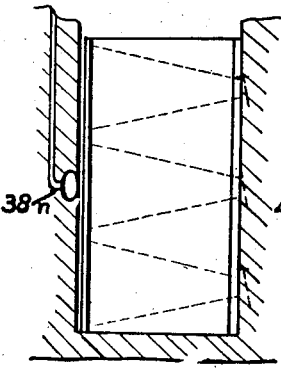
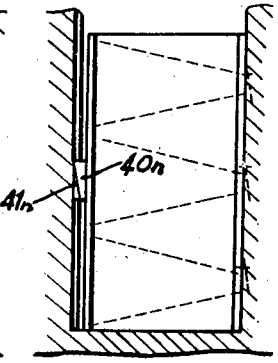
INVENTOR
PIERRE F. DANEL
BY George H. Corey
ATTORNEY Patented Mar. 2, 1948

2,436,793

UNITED STATES PATENT OFFICE 2,436,793

SEA WAVE POWER INSTALLATION

Pierre F. Danel, Grenoble, France, assignor to Ateliers Neyret-Beylier & Piccard-Pictet (Societe Anonyme), Grenoble, France Application October 5, 1945, Serial No. 620,601
In France July 1, 1944

Section 1, Public Law 690, August 8, 1946
Patent expires January 7, 1964

20 Claims. (Cl. 61—20)

The present invention relates to installations for recovering energy from sea waves in an economically useful form. It is particularly concerned with installations of this character which comprise a concentrating canal, opening at its outer end to the sea for receiving the waves, in which the amplitude of the waves is increased and in which water moved by the waves is directed at the inner end of the canal against an impounding gate which conducts the water into a storage reservoir and prevents its return therefrom through the canal. The water accumulates in the reservoir to a height above the mean level of the sea in a calm state. The potential energy represented by the head thus created may be employed for utilitarian purposes.

In the operation of installations of this character it is desirable that the impounding gate be capable of being made accessible, either to repair damage to, or structural failure in, the gate, or to remove foreign bodies, such as wreckage or sea weed, with which the gate may have become clogged. Underwater operations are particularly difficult in such installations because of the great force of the waves at the inner end of the canal. It is also desirable, in installation of this character, that the impounding gate assembly be capable of being readily replaced by another gate assembly of different characteristics to accommodate the installation to changes in the character of the sea, for example, to such changes as the rise or fall of the tide or to changes in the size and character of the waves due to storms or seasonal variations.

The present invention has as an object the provision of an installation of the character referred to in which the impounding gates are conveniently removable and replaceable and in which provision is made for gaining access to the gate, for inspection or cleaning or for repairing the structure, without the necessity of draining the storage reservoir or of carrying out the work underwater.

The invention contemplates the employment of two watertight isolating barriers located on opposite sides of the impounding gate at a short distance therefrom. These barriers are arranged to be easily placed in position when the gate is to be removed, or inspected or repaired in place. The seaward barrier will prevent the waves from reaching the gate. When it is in place, the water about the gate will be still, thus facilitating removal of the gate or cleaning or other operations on the gate while it is in place. When both barriers are in place, water may be pumped from the space between them to render the gate accessible.

The isolating barriers are slidable in guideways provided in the surface of the inner walls of the concentrating canal. Provision is made for closing these guideways, when the barriers have been removed from place, by means of filler elements which serve to provide a continuous surface on the inner face of the canal in order to prevent undesirable turbulence in the flow of water in the canal, which would decrease the output of the installation.

In accordance with the invention, the impounding gate itself is made up from separate demountable units so that it may be easily removed for inspection, repair or replacement.

The impounding gate, its isolating barriers, and the filler elements for walling up the barrier guideways are provided with quick-acting means for securing them in place which, while permitting an easy and rapid disengagement when these removable elements are to be removed, also automatically take up any play that may exist between these elements and their guideways. The provision of such take-up means is important in order to avoid deterioration of the structure since the removable elements otherwise would undergo a certain amount of rattling or vibration in their guideways, under the buffeting of the waves, which, if not suppressed, will become greater during the course of operation of the structure.

The particular type of locking or securing means to be employed in connection with the removable elements will be adapted to the economic importance of the particular installation. These means, for example, may comprise simple wedges which cooperate with inclined surfaces on the removable element or on the guideway or they may take the form of pins slideably mounted in the elements and arranged to be urged outwardly thereof to bear against one side wall of the guideway to force the element against the opposite side wall of the guideway. The operation of the pins may be under the control of the different removable elements themselves in such a way that the placing in position of an element at a higher level brings about the locking of an element below it. In some cases, the locking means may take the form of eccentrics disposed to wedge the removable elements in their guideways and, if desired, arranged so that all of the eccentrics can be operated by a single control. In other cases, hydraulically operated locking means will be found advantageous.

The invention and the different ways in which it may be practically embodied will be set forth in the following specification and the attached drawings, showing various particular embodiments by way of illustration and not of limitation, in which:

Fig. 3 is a horizontal section through an isolating barrier guideway showing a filler element therein.

Fig. 4 is similar to Fig. 3, but shows a modification of the filler element;

Fig. 5 is a vertical section through an isolating barrier guideway, showing a filler element in place;

Fig. 10 is an elevation of still another means for securing the impounding gate in place;

Fig. 11 is an elevation showing a further modification of the impounding gate securing means; and Fig. 12 is an elevation showing a still further modification of the impounding gate securing means.

Figure 1:
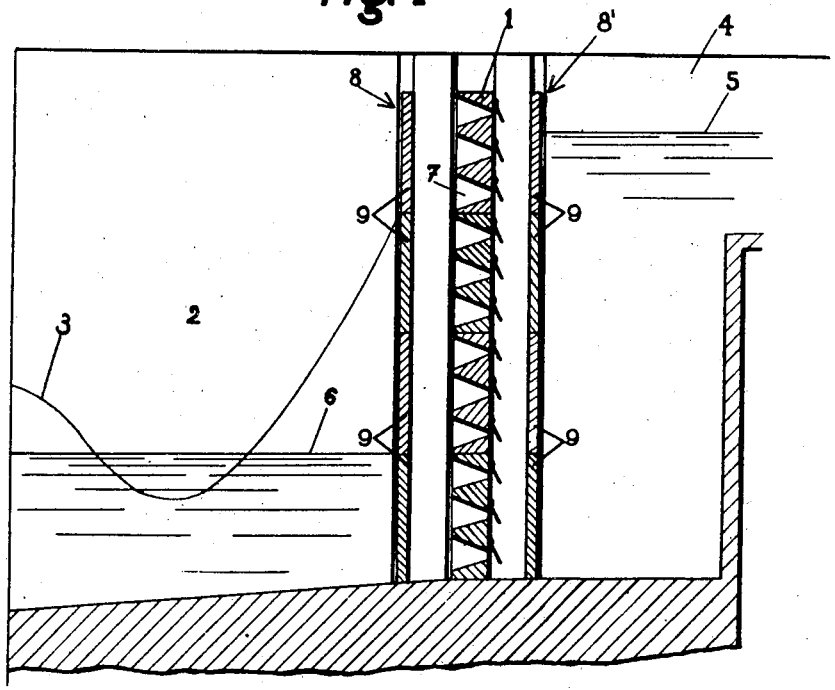
Fig. 1 is a vertical mid-section of an installation for recovering energy from sea waves in accordance with the invention.
Figure 2:
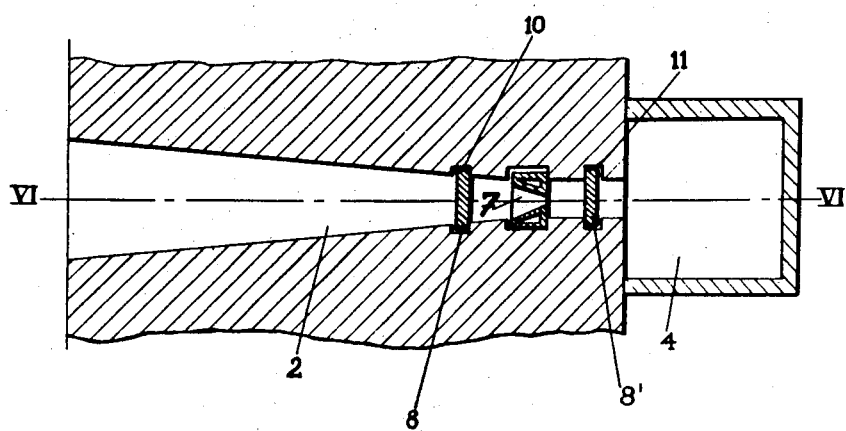
Fig. 2 shows the installation of Fig. 1 in horizontal section.

The general organization of an installation for recovering energy from sea waves to which the invention of the present application is applicable is shown in Figs. 1 and 2. The concentrating canal 2 has its larger end opening seawardly for the reception of incoming waves from the sea. As the waves 3 travel inwardly through the canal 2 they are caused to increase in amplitude under the influence of the converging canal walls until they ultimately reach the impounding gate 1 through which water is forced by the motion of the waves into the reservoir 4. The water accumulates in the reservoir to a level 5 which is above the mean level 6 of the sea. The impounding gate 1 is provided with a series of elements 7 which receive the water from the canal and permit it to pass into the reservoir but which inhibit return flow from the reservoir into the canal.

In accordance with the present invention, provision is made for convenient inspection or repair of the impounding gate 1 by means of isolating barriers 8 and 8' located on the seaward side and the landward side of the impounding gate 1 respectively. The isolating barriers are made up of a plurality of similar elements 9 which may be held in place in suitable guideways 10 and 11 located in the walls of the canal 2. The barriers 8 and 8' are located as closely as is conveniently possible to the impounding gate 1 in order that the same means may be employed for placing and removing the barriers as is employed for placing or removing the impounding gate. Such placing and removing means may, for example, consist of cranes or winches or other suitable apparatus. However, it is desirable to space the isolating barriers 8 and 8' a sufficient distance from the impounding gate structure 1 to provide working room for carrying out repairs or other operations in the space between a barrier and the impounding gate.

One of the barriers may be advantageously located at or near the narrowest part of the canal.

The barriers 8 and 8', when in position in their guideways 10 and 11, serve to shelter the impounding gate assembly from the pounding of the waves 3 which enter the canal, as well as from all water currents, and thus permit the impounding gate to be lifted from place in its guideways without interference by the water.

The barriers 8 and 8' may be employed simultaneously or only one of them may be employed at a time, depending upon the nature of the work to be done on the installation. For example, the barrier 8 would be employed if protection from the waves alone will permit the necessary work to be done effectively. The barrier 8' might be employed alone, for example, if some foreign body were to be removed from the impounding gate, and particularly if the foreign body interfered with placing of the seaward barrier 8.

The provision of guideways for the isolating barriers 8, 8' greatly facilitates placing and removal of the barriers, besides serving to maintain them securely in position, but when the barriers are removed and the installation is in operation for the production of power, these guideways tend to decrease the efficiency of the installation if they remain exposed to the action of the waves. When a wave travels along the canal the movement of the water is violent and as it flows past the guideways substantial eddies will be set up and this will lead to a waste of a significant amount of energy and lower the overall efficiency of the installation. In order to avoid this undesirable effect, I provide means for closing off the guideways in the form of filler elements 12 which serve to make the working faces of the canal as smoothly continuous as possible. These filler elements 12 may comprise simply concrete or metal plates (Fig. 3), placed in appropriate slideways 13 in the walls of the guideways 10 and 11, or they may take a more complex shape such as that illustrated at 14 in Figure 4, in which the filler element is provided with a part 15 disposed to bear against the inner face of the guideway 10 or 11 to urge the filler element outwardly of the guideway. This action of the part 15 serves to avoid play between the filler element and the guideway and thus prevent rattling or vibration of the filler element in the guideway, under the pounding of the sea, and its consequent rapid deterioration.

An arrangement for taking up play between the filler elements and the guideway in accordance with the invention is illustrated in Fig. 5. A plurality of filler elements 12 are placed one above the other in the outer part of the guideway. Each element is provided with a lug 16 on its inner face having an inclined surface sloping away from the filler element in a downward direction. For each filler element a wedge block 17 is provided. Each wedge block 17 has an inclined surface on its outer face which bears against the inclined surface of the lug 16 on the corresponding filler element. The wedge block 17 is of such a thickness as to bear on its inner side against the inner face of the guideway 10 or 11. Trunnions 18 mounted on the filler elements 12 are loosely received in elongated openings 19 in the wedges 17. The elongated openings 19 permit a limited degree of movement between the filler elements 12 and the wedge blocks in a horizontal direction, and a greater amount of relative movement in a vertical direction. As the wedge blocks move downwardly under their own weight, their inclined surfaces slide on the inclined surfaces 16 and operate to urge the filler elements 12 outwardly and thus to prevent any movement of the element 12 in its own slideway 13. When a filler element is to be removed, the wedge 17 is first independently lifted, whereupon the inclined surfaces of the wedge and filler element disengage to free the filler element. Thereafter, as the wedge moves upwardly, the trunnion 18 engages with the bottom of the elongated slot 19 and carries the filler element 12 along with the wedge 17 as the latter is lifted out of the guideway.

The observations made above regarding the necessity of securely locking the removable filler elements in the guideways to prevent play between the elements and the guideway, apply with equal force to the isolating barriers and to the impounding gate, since the removability of these elements requires that they also be provided with means for securing them against movement when they are in place. Different types of such means for securing the various removable elements of the installation against movement will be described in detail below as applied to the impounding gate. It will be appreciated that all of these various types are also applicable to the barriers and to the filler elements.

Figure 6:
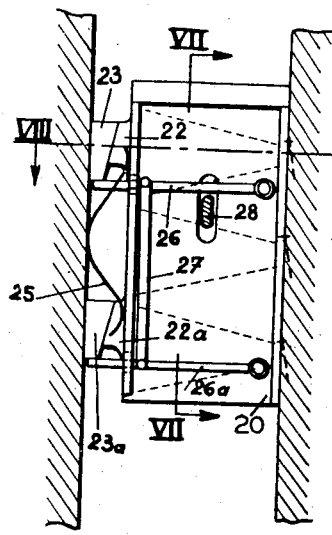
Fig. 6 is a vertical section through a unit of the impounding gate, illustrating one form of locking means.
Figure 7:
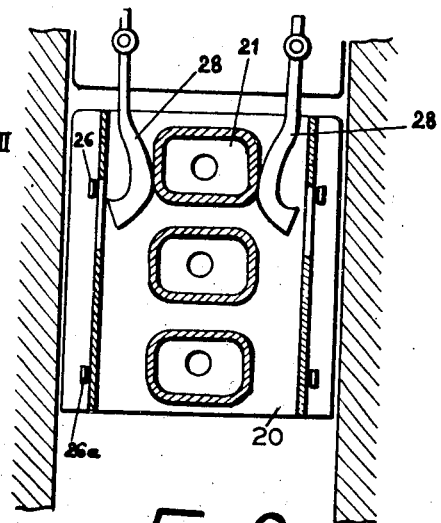
Fig. 7 is a vertical section on line 7—7 of Fig. 6.
Figure 8:
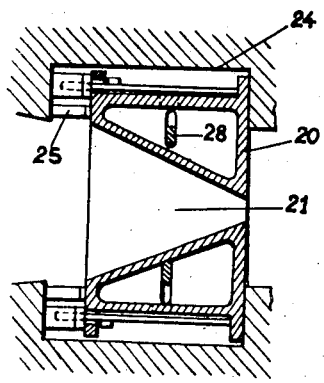
Fig. 8 is a horizontal section on line 8—8 of Fig. 6.

The impounding gate may advantageously be formed from a plurality of separate identical units, placed one above the other to form an impounding gate of the height desired. Such an individual impounding gate unit is indicated at 20 in Figs. 6, 7 and 8, and is shown as including a nozzle 21 through which water passes from the canal into the storage reservoir. It will be understood that suitable one-way valves, not illustrated, will be provided for preventing return flow of water from the reservoir through the nozzles 21. Each individual unit 20 is provided on one side with a pair of lugs 22, 22a having inclined outer surfaces with which cooperate movable wedges 23, 23a. Unit 20 is normally urged against the opposite side wall of its guideway 24 by means of a leaf spring 25. The wedges 23 and 23a are connected to the unit 20 by suitable connections (not shown) and serve to automatically wedge the unit 20 against the opposite side wall of the guideway 24 by their own weight. Unwedging of the unit 20 is effected by two levers 26 and 26a which act upon the wedges 23 and 23a when the element is hoisted from place. These levers 26 and 26a are connected together by means of a link 27 and are operated by hooks 28 which serve to engage the element 20 to lift it from place. Referring to Fig. 7, it will be seen that the hooks 28, when moved outwardly through openings in a wall of the unit 20 to engage the unit for the purpose of lifting it from place, engage first with the levers 26 and 26a and lift them to unwedge the wedges 23 and 23a. The unit 20 being thus freed, it is possible to withdraw the entire assembly of the unit 20 which includes the wedges 23 and 23a.

Figure 9:
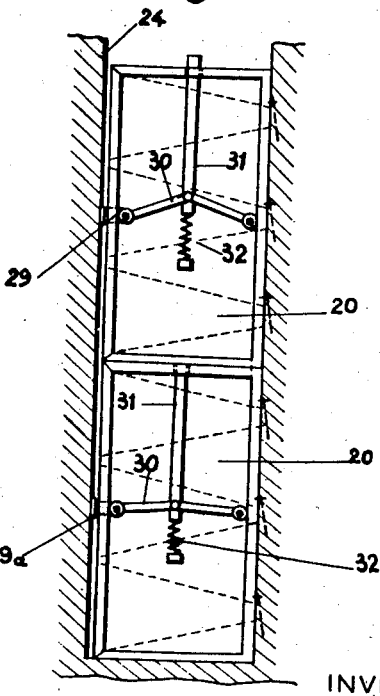
Fig. 9 is an elevation showing another form of means for securing the impounding gate in place.

Fig. 9 shows an alternative arrangement for locking the individual units 20 in position in which slidable pins 29 moveable outwardly from one side of the units 20, are arranged to bear against the adjacent side wall of the guideway 24. Each pin 29 is forced outwardly against the side wall of the guideway by a toggle linkage 30 which is operated by a push rod 31 extending upwardly from the pivot of the toggle to a point slightly above the upper surface of the unit 20. When one of the gate units is removed, the rod 31 of the next lower unit is moved upwardly under the influence of a coil spring 32 to actuate the toggle linkage 30 to withdraw the pin 28, thus placing this next lower unit in condition to be removed in its turn. When the units 20 are lowered into place in the guideways 24, each unit 20, except the lowermost unit, bears on the rod 31 of the next lower unit and thus causes it to be locked in place by means of the toggle linkage 30 and the pin 29 associated therewith. Thus in Fig. 9 the lower unit 20 is locked in position by the pin 29 which is forced outwardly against the side wall of the guideway by the weight of the upper unit 20 bearing on the push rod 31.

Fig. 10 illustrates a further modification of locking means for securing the impounding gate units in position. In this modification, the units 20 are jammed against one of the side walls of the guideway 23 by a plurality of eccentrics 33, 33a, 33n, mounted on the sides of the units between the unit and the adjacent side wall of the guideway. Each eccentric 33, etc., is carried on the end of a lever 34 which is mounted for pivotal movement about a fixed pivot 34', under the influence of an equalizer link 35, the uppermost of these links being connected to an upright pull rod 36. A plurality of eccentrics are distributed over the height of the guideway 24 and are interconnected by a series of pull rods 36a, . . . 36n, to the common pull rod 36 which serves to operate all of the eccentrics from a single control station.

In Fig. 11 is shown another modification of the impounding gate locking means embodying a hydraulic locking system. An hydraulic conduit 37 is provided with branches 38, 38a, . . . 38n which feed fluid to a series of individual expansible chambers 39 disposed to be expanded against the side of the gate units 20 under the influence of the hydraulic pressure from the common conduit 37. The expansible chambers 39 may be replaced by cylinders containing pistons adopted to be forced against the gate units 20 by the hydraulic pressure of the fluid in the conduits.

Fig. 12 illustrates still another arrangement for locking the gate units 20 in the guideway, in which lugs 40 having inclined outer surfaces are fixed on one side of each of the units to cooperate with inclined surfaces 41 provided on the adjacent wall of the guideway 24. The inclined surfaces 41, 41a . . . , 41n on the wall of the guideway are disposed out of vertical alignment with each other in a direction such that each inclined surface is positioned farther away from the center line of the guideway than the inclined surface immediately below it so that it will not obstruct the passage of the lugs 40a . . . 40n on the gate units lower down in the guideway. Thus, the upper inclined surface 41 is stepped outwardly with respect to the inclined surface 41a so that the inclined surfaces on the two lower units may pass freely by the surface 41 when these lower units are hoisted out of the guideway.

The various locking arrangements which have been described in connection with the impounding gate assembly may be applied to the locking of the filler elements 12 and, also, similarly applied to the barrier elements 9. The barrier elements 9 may be secured in the same manner as the units of the impounding gate assembly by means which apply pressure to their faces, or in the manner in which the filler elements 12 are secured in the embodiment of Figs. 4 and 5 by means bearing on the inner face of the guideway and on the edge of the barrier.

The embodiments of the invention hereinbefore described and illustrated in the accompanying drawings are presented by way of exemplification and not by way of limitation of the scope of the invention which is not to be deemed as limited otherwise than as indicated by the appended claims.

I claim:

1. In an installation for the recovery from sea waves of energy in an economically useful form, the combination of a concentrating canal open at its outer end to the sea for receiving the waves and increasing their amplitude as they move inwardly therein, a reservoir at the inner end of the canal, an impounding gate for conducting water from the canal into the reservoir and preventing return flow from the reservoir into the canal, and a removable and replaceable watertight barrier for preventing access of water to the impounding gate.

2. In an installation for the recovery from sea waves of energy in an economically useful form, the combination of a concentrating canal open at its outer end to the sea for receiving the waves and increasing their amplitude as they move inwardly therein, a reservoir at the inner end of the canal, an impounding gate for conducting water from the canal into the reservoir and preventing return flow from the reservoir into the canal, and a removable and replaceable watertight barrier for preventing access of water from the canal to the impounding gate.

3. In an installation for the recovery from sea waves of energy in an economically useful form, the combination of a concentrating canal open at its outer end to the sea for receiving the waves and increasing their amplitude as they move inwardly therein, a reservoir at the inner end of the canal, an impounding gate for conducting water from the canal into the reservoir and preventing return flow from the reservoir into the canal, and a removable and replaceable watertight barrier for preventing access of water from the reservoir to the impounding gate.

4. In an installation for the recovery from sea waves of energy in an economically useful form, the combination of a concentrating canal open at its outer end to the sea for receiving the waves and increasing their amplitude as they move inwardly therein, a reservoir at the inner end of the canal, an impounding gate for conducting water from the canal into the reservoir and preventing return flow of water from the reservoir into the canal, a vertical guideway in the surface of each of the side walls of the canal which is exposed to the waves for the reception of a removable watertight barrier, and removable filler elements positioned in said guideways and presenting outer surfaces which lie approximately flush with and in continuation of the surface of the canal wall which is exposed to the waves.

5. In an installation for the recovery from sea waves of energy in an economically useful form, the combination of a concentrating canal open at its outer end to the sea for receiving the waves and increasing their amplitude as they move inwardly therein, a reservoir at the inner end of the canal, an impounding gate for conducting water from the canal into the reservoir and preventing return flow from the reservoir into the canal, and a removable and replaceable watertight barrier on each side of the impounding gate for preventing access of water to the impounding gate.

6. In an installation for the recovery from sea waves of energy in an economically useful form, the combination of a concentrating canal open at its outer end to the sea for receiving the waves and increasing their amplitude as they move inwardly therein, a reservoir at the inner end of the canal, an impounding gate for conducting water from the canal into the reservoir and preventing return flow from the reservoir into the canal, said impounding gate being removably mounted in vertical guideways in the inner surfaces of the side walls of the canal, and means for locking the impounding gate against movement in said guideways under the buffeting of the sea.

7. In an installation for the recovery from sea waves of energy in an economically useful form, the combination of a concentrating canal open at its outer end to the sea for receiving the waves and increasing their amplitude as they move inwardly therein, a reservoir at the inner end of the canal, an impounding gate for conducting water from the canal into the reservoir and preventing return flow from the reservoir into the canal, a removable and replaceable watertight barrier for preventing access of water to the impounding gate, and means for locking the watertight barrier against movement under the buffeting of the sea.

8. In an installation for the recovery from sea waves of energy in an economically useful form, the combination of a concentrating canal open at its outer end to the sea for receiving the waves and increasing their amplitude as they move inwardly therein, a reservoir at the inner end of the canal, an impounding gate for conducting water from the canal into the reservoir and preventing return flow from the reservoir into the canal, a vertical guideway in the inside surface of each of the side walls of the canal for the reception of a removable watertight barrier, removable and replaceable filler elements positioned in said guideways and presenting outer surfaces which lie approximately flush with and in continuation of the surface of the canal wall, and means for locking the filler elements in said guideways against movement in said guideways under the buffeting of the sea.

9. In an installation for the recovery from sea waves of energy in an economically useful form, the combination of a concentrating canal open at its outer end to the sea for receiving the waves and increasing their amplitude as they move inwardly therein, a reservoir at the inner end of the canal, an impounding gate for conducting water from the canal into the reservoir and preventing return flow from the reservoir into the canal, said impounding gate being formed from a plurality of separate, individually removable and replaceable units, and means for locking each gate unit in position against movement under the buffeting of the sea.

10. In an installation for the recovery from sea waves of energy in an economically useful form, the combination of a concentrating canal open at its outer end to the sea for receiving the waves and increasing their amplitude as they move inwardly therein, a reservoir at the inner end of the canal, an impounding gate for conducting water from the canal into the reservoir and preventing return flow from the reservoir into the canal, said impounding gate being formed from a plurality of separate, individually removable and replaceable units, means for locking each gate unit in position against movement under the buffeting of the sea, and a common control means for locking and unlocking the individual locking means.

11. In an installation for the recovery from sea waves of energy in an economically useful form, the combination of a concentrating canal open at its outer end to the sea for receiving the waves and increasing their amplitude as they move inwardly therein, a reservoir at the inner end of the canal, an impounding gate for conducting water from the canal into the reservoir and preventing return flow from the reservoir into the canal, said impounding gate being removably mounted in vertical guideways in the inner surfaces of the side walls of the canal, and movable wedges for locking the gate in position in said guideways against movement under the buffeting of the sea.

12. In an installation for the recovery from sea waves of energy in an economically useful form, the combination of a concentrating canal open at its outer end to the sea for receiving the waves and increasing their amplitude as they move inwardly therein, a reservoir at the inner end of the canal, an impounding gate for conducting water from the canal into the reservoir and preventing return flow from the reservoir into the canal, said impounding gate being removably mounted in vertical guideways in the inner surfaces of the side walls of the canal, and means for locking the gate in position in said guideways against movement under the buffeting of the sea, said locking means comprising slidable means adapted to be moved outwardly of the gate to secure said gate in position.

13. In an installation for the recovery from sea waves of energy in an economically useful form, the combination of a concentrating canal open at its outer end to the sea for receiving the waves and increasing their amplitude as they move inwardly therein, a reservoir at the inner end of the canal, an impounding gate for conducting water from the canal into the reservoir and preventing return flow from the reservoir into the canal, said impounding gate being removably mounted in vertical guideways in the inner surfaces of the side walls of the canal, and a rotatable eccentric for securing the gate in position in the guideways.

14. In an installation for the recovery from sea waves of energy in an economically useful form, the combination of a concentrating canal open at its outer end to the sea for receiving the waves and increasing their amplitude as they move inwardly therein, a reservoir at the inner end of the canal, an impounding gate for conducting water from the canal into the reservoir and preventing return flow from the reservoir into the canal, said impounding gate being removably mounted in vertical guideways in the inner surfaces of the side walls of the canal, and hydraulic means for securing the gate in position in the guideways.

15. In an installation for the recovery from sea waves of energy in an economically useful form, the combination of a concentrating canal having side walls diverging toward the sea for receiving the waves and increasing their amplitude as they move inwardly therein, a reservoir at the inner end of the canal, a set of vertical guideways in the inside surfaces of the side walls of the canal, an impounding gate removably mounted in said guideways for conducting water from the canal to the reservoir and preventing return flow from the reservoir to the canal, a removable and replaceable watertight barrier for preventing access of water to the gate, a second set of vertical guideways in the inner surfaces of the side walls of the canal for receiving said barrier, filler elements removable from and replaceable in said second set of guideways and presenting, when in position in said guideways, outer surfaces which lie approximately flush with and in continuation of the surface of the canal wall, and means for locking removable elements of the installation against movement in their guideways under the buffeting of the sea.

16. In an installation for the recovery from sea waves of energy in an economically useful form, the combination of a concentrating canal opening toward the sea for receiving the waves and increasing their amplitude as they move inwardly therein, a reservoir at the inner end of the canal, an impounding gate for conducting water from the canal to the reservoir and preventing return flow from the reservoir to the canal, vertical guideways on the side walls of the canal to receive removable and replaceable elements of the installation, and means for locking an element therein against movement in the guideway under the buffeting of the sea.

17. In an installation for the recovery from sea waves of energy in an economically useful form, the combination of a concentrating canal opening toward the sea for receiving the waves and increasing their amplitude as they move inwardly therein, a reservoir at the inner end of the canal, an impounding gate for conducting water from the canal to the reservoir and preventing return flow from the reservoir to the canal, vertical guideways on the side walls of the canal to receive removable and replaceable elements of the installation, and movable wedges for locking an element therein against movement in the guideway under the buffeting of the sea.

18. In an installation for the recovery from sea waves of energy in an economically useful form, the combination of a concentrating canal opening toward the sea for receiving the waves and increasing their amplitude as they move inwardly therein, a reservoir at the inner end of the canal, an impounding gate for conducting water from the canal to the reservoir and preventing return flow from the reservoir to the canal, vertical guideways on the side walls of the canal to receive removable and replaceable elements of the installation, and slidable means movable outwardly of the elements to engage the guideway for locking an element therein against movement in the guideway under the buffeting of the sea.

19. In an installation for the recovery from sea waves of energy in an economically useful form, the combination of a concentrating canal opening toward the sea for receiving the waves and increasing their amplitude as they move inwardly therein, a reservoir at the inner end of the canal, an impounding gate for conducting water from the canal to the reservoir and preventing return flow from the reservoir to the canal, vertical guideways on the side walls of the canal to receive removable and replaceable elements of the installation, and a plurality of rotatable eccentrics for locking an element therein against movement in the guideway under the buffeting of the sea.

20. In an installation for the recovery from sea waves of energy in an economically useful form, the combination of a concentrating canal opening toward the sea for receiving the waves and increasing their amplitude as they move inwardly therein, a reservoir at the inner end of the canal, an impounding gate for conducting water from the canal to the reservoir and preventing return flow from the reservoir to the canal, vertical guideways on the side walls of the canal to receive removable and replaceable elements of the installation, and hydraulic means for locking an element therein against movement in the guideway under the buffeting of the sea.

PIERRE F. DANEL.

REFERENCES CITED

The following references are of record in the file of this patent:

UNITED STATES PATENTS

| Number | Name | Date |
|---|---|---|
| 1,529,966 | Sirnit | Mar. 17, 1925 |